J. GRABOWIECKI.
VEHICLE WHEEL.
APPLICATION FILED MAY 11, 1918. RENEWED APR. 2, 1919.

1,305,535.   Patented June 3, 1919.
2 SHEETS—SHEET 1.

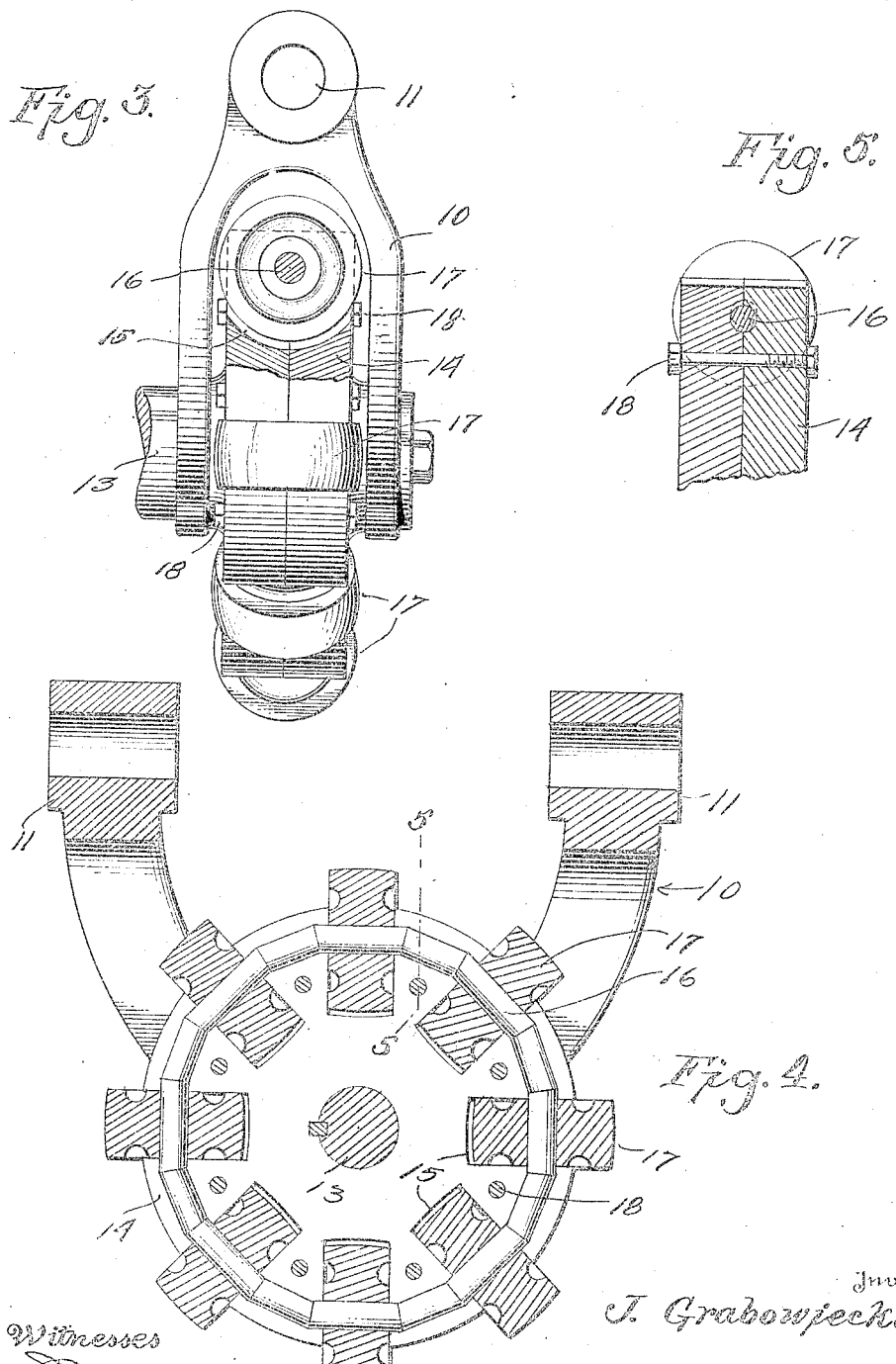

UNITED STATES PATENT OFFICE.

JOSEPH GRABOWIECKI, OF DETROIT, MICHIGAN.

VEHICLE-WHEEL.

1,305,535.  Specification of Letters Patent.  Patented June 3, 1919.

Application filed May 11, 1918, Serial No. 233,872. Renewed April 2, 1919. Serial No. 287,071.

*To all whom it may concern:*

Be it known that I, JOSEPH GRABOWIECKI, a subject of Austria-Hungary, residing at Detroit, in the county of Wayne and State of Michigan, have invented certain new and useful Improvements in Vehicle-Wheels, of which the following is a specification.

This invention relates to rollers or wheels for car turning jacks or trucks.

One object of the invention is to provide a non-swiveling wheel which is so arranged that it may be used to move a truck in any direction without dragging and scarring the floor.

Another object of the invention is to provide a wheel of this character with means for connecting it swively to the track or jack.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Fig. 3 is an edge view of the device partly broken away.

Fig. 4 is a vertical median section through Fig. 3.

Fig. 5 is a section on the line 5—5 of Fig. 4.

Figure 1:
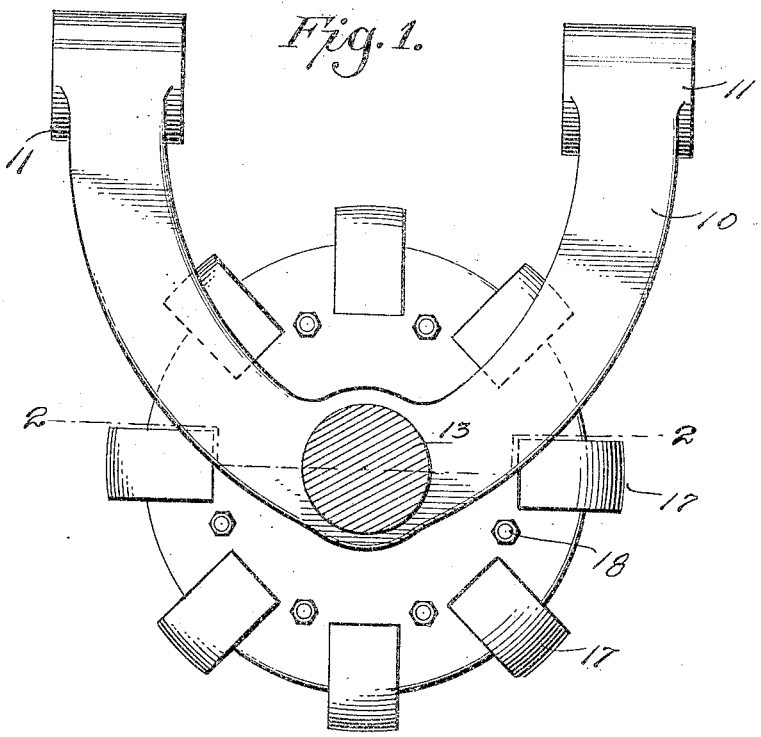
Figure 1 is a side elevation of the device, the shaft being shown in section.
Figure 2:
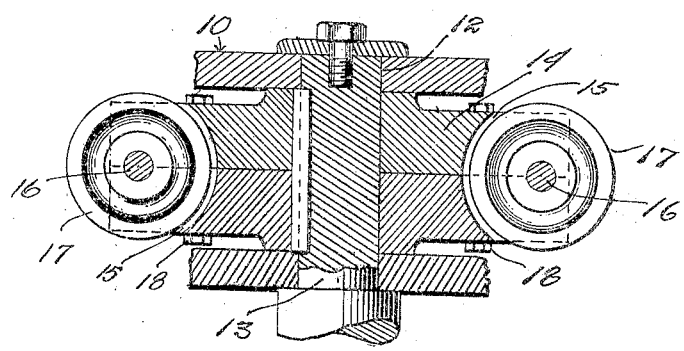
Fig. 2 is a detail section on the line 2—2 of Fig. 1.

In carrying out the objects of this invention and in the embodiment of the device herein shown there has been disclosed a yoke 10 having double arms which are connected at their upper ends by means of bearing eyes 11. The arms of this yoke 10 are provided with suitable openings 12 for the reception of a shaft 13. On this shaft 13 is mounted the wheel body which consists of a pair of circular plates 14 having their peripheries recessed at intervals as at 15.

Moreover the confronting faces of these plates are provided with grooves adjacent the peripheries and in these grooves are held short shafts 16 whereon are mounted rollers 17 the outer portions of which project beyond the peripheries of the disks 14. The two disks are held together by suitable screw bolts 18 and if desired the shaft 13 may be extended to connect a pair of the yokes 10. A suitable pin connection may be made between this device and the body of the truck so as to allow for swinging movement of the yoke as will be readily understood. This pin connection does not form part of the invention and is therefore not particularly illustrated.

In the operation of the device it will be seen that when the jack or the like mechanism is supported on this wheel backward and forward movement may be obtained by rotation of the main wheel comprising the disks 14 while lateral movement is permitted by the roller 17, each movement being a rolling movement. It will be obvious that a combination of these two movements may be obtained in any angular relation by the coaction of the main wheel and rollers.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new is:—

1. In a device of the kind described, a main wheel consisting of a pair of disks provided with registering grooves on their confronting faces adjacent their peripheries, said disks being further provided with registering recesses extending radially inward from their peripheries, shafts mounted in said grooves, rollers rotatably mounted on said shafts, and means to hold the disks together.

2. In a device of the kind described, a yoke provided at its upper end with means for pivotal connection to a structure, a shaft extending through the lower end of said yoke transversely to the connecting means at the upper end thereof, a main wheel carried by said shaft, and rollers arranged peripherally around the main wheel and having their axes at right angles to the axis of the main wheel.

In testimony whereof I affix my signature.

JOSEPH GRABOWIECKI.

Witnesses:
 WM. C. A. ROEGLIN,
 VICTOR WINDSMUTH.